United States Patent
Kim et al.

(10) Patent No.: US 7,626,111 B2
(45) Date of Patent: Dec. 1, 2009

(54) SIMILAR MUSIC SEARCH METHOD AND APPARATUS USING MUSIC CONTENT SUMMARY

(75) Inventors: Hyoung Gook Kim, Yongin-si (KR); Ki Wan Eom, Seoul (KR); Ji Yuen Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 54 days.

(21) Appl. No.: 11/487,399

(22) Filed: Jul. 17, 2006

(65) Prior Publication Data

US 2007/0169613 A1     Jul. 26, 2007

(30) Foreign Application Priority Data

Jan. 26, 2006   (KR) .................. 10-2006-0008160

(51) Int. Cl.
   *G10H 1/00* (2006.01)
(52) U.S. Cl. .......................................... 84/600; 700/94
(58) Field of Classification Search ........... 84/600–602; 700/94
   See application file for complete search history.

(56) References Cited

U.S. PATENT DOCUMENTS

| | | | | |
|---|---|---|---|---|
| 5,616,876 | A * | 4/1997 | Cluts | 84/609 |
| 6,201,176 | B1 * | 3/2001 | Yourlo | 84/609 |
| 6,545,209 | B1 * | 4/2003 | Flannery et al. | 84/609 |
| 6,657,117 | B2 * | 12/2003 | Weare et al. | 84/668 |
| 6,813,600 | B1 * | 11/2004 | Casey et al. | 704/200.1 |
| 6,987,221 | B2 * | 1/2006 | Platt | 84/601 |
| 7,022,905 | B1 * | 4/2006 | Hinman et al. | 84/609 |
| 7,022,907 | B2 * | 4/2006 | Lu et al. | 84/611 |
| 7,091,409 | B2 | 8/2006 | Li et al. | |
| 7,102,067 | B2 * | 9/2006 | Gang et al. | 84/600 |
| 7,115,808 | B2 * | 10/2006 | Lu et al. | 84/611 |

(Continued)

FOREIGN PATENT DOCUMENTS

| KR | 10-2003-0067377 | 8/2003 |
|---|---|---|
| KR | 10-2006-0091063 | 8/2006 |

OTHER PUBLICATIONS

Pfeiffer et al., "Formation of MPEG-1 compressed domain audio features", CSIRO Mathematical and Information Sciences, Dec. 18, 2001, pp. 1-18 (in English).

(Continued)

*Primary Examiner*—David S. Warren
(74) *Attorney, Agent, or Firm*—Staas & Halsey LLP

(57) ABSTRACT

A similar music search method, including: extracting an audio feature value from a compression zone of a music file and generating a music content summary using the extracted audio feature; classifying a mood and a genre of the music file by using the generated music content summary; extracting a similarity feature for a similarity retrieval from the music content summary; storing an information on the classified mood and a genre and the extracted similarity feature information in a database; receiving a query music; detecting the mood and the genre of the query music; measuring a similarity between the query music and music files having a mood and a genre identical to the query music by referring to the database; and retrieving the similar music with respect to the query music based on the measured similarity.

22 Claims, 9 Drawing Sheets

U.S. PATENT DOCUMENTS

| | | | | |
|---|---|---|---|---|
| 7,203,558 | B2* | 4/2007 | Sugiyama et al. | 700/94 |
| 7,227,071 | B2* | 6/2007 | Tagawa et al. | 84/601 |
| 7,279,629 | B2* | 10/2007 | Hinman et al. | 84/615 |
| 7,302,451 | B2* | 11/2007 | Radhakrishnan et al. | 707/104.1 |
| 7,326,848 | B2* | 2/2008 | Weare et al. | 84/668 |
| 2002/0178012 | A1* | 11/2002 | Wang et al. | 704/503 |
| 2002/0181711 | A1 | 12/2002 | Logan et al. | |
| 2003/0004711 | A1* | 1/2003 | Koishida et al. | 704/223 |
| 2003/0040904 | A1 | 2/2003 | Whitman et al. | |
| 2003/0135513 | A1* | 7/2003 | Quinn et al. | 707/102 |
| 2003/0205124 | A1 | 11/2003 | Foote et al. | |
| 2003/0221541 | A1* | 12/2003 | Platt | 84/609 |
| 2004/0060426 | A1* | 4/2004 | Weare et al. | 84/668 |
| 2004/0107821 | A1 | 6/2004 | Alcalde et al. | |
| 2004/0194612 | A1* | 10/2004 | Parees | 84/609 |
| 2004/0231498 | A1 | 11/2004 | Li et al. | |
| 2004/0237759 | A1* | 12/2004 | Bill | 84/668 |
| 2005/0091062 | A1* | 4/2005 | Burges et al. | 704/273 |
| 2005/0091066 | A1* | 4/2005 | Singhal | 704/500 |
| 2005/0092165 | A1* | 5/2005 | Weare et al. | 84/668 |
| 2005/0096898 | A1* | 5/2005 | Singhal | 704/205 |
| 2005/0109194 | A1* | 5/2005 | Gayama | 84/613 |
| 2005/0120868 | A1* | 6/2005 | Hinman et al. | 84/615 |
| 2005/0129251 | A1* | 6/2005 | Schulz | 381/56 |
| 2005/0165779 | A1* | 7/2005 | Kaiser et al. | 707/6 |
| 2005/0211071 | A1* | 9/2005 | Lu et al. | 84/611 |
| 2005/0251532 | A1* | 11/2005 | Radhakrishnan et al. | 707/104.1 |
| 2006/0032363 | A1* | 2/2006 | Platt | 84/601 |
| 2006/0054007 | A1* | 3/2006 | Lu et al. | 84/611 |
| 2006/0096447 | A1* | 5/2006 | Weare et al. | 84/616 |
| 2006/0107823 | A1* | 5/2006 | Platt et al. | 84/616 |
| 2007/0107584 | A1* | 5/2007 | Kim et al. | 84/612 |
| 2007/0131095 | A1* | 6/2007 | Park et al. | 84/609 |
| 2007/0131096 | A1* | 6/2007 | Lu et al. | 84/611 |
| 2008/0022844 | A1* | 1/2008 | Poliner et al. | 84/609 |

OTHER PUBLICATIONS

Text of article found at http://biblioteca.universia.net/ficha.do?id=5803413, Compressed Domain Processing of MPEG Audio, Anantharaman, B (in English).

E. Pampalk, A. Flexer, and G. Widmer. Improvements of audio-based music similarity and genre classification. In Proc ISMIR, 2005.

Jonathan Foote, Visualizing music and audio using self-similarity, Proceedings of the seventh ACM international conference on Multimedia (Part 1), p. 77-80, Oct. 30-Nov. 5, 1999, Orlando, Florida, United States.

Wold, E.; Blum, T.; Keislar, D.; Wheaten, J., "Content-based classification, search, and retrieval of audio." Multimedia, IEEE, vol. 3, No. 3 pp. 27-36, Fall 1996.

Zhu Liu; Qian Huang, "Content-based indexing and retrieval-by-example in audio," Multimedia and Expo, 2000. ICME 2000. 2000 IEEE International Conference on, vol. 2, No. pp. 877-880 vol. 2, 2000.

U.S. Appl. No. 11/487,327, filed Jul. 17, 2006, Hyoung Gook Kim, Samsung Electronics Co., Ltd.

U.S. Office Action mailed May 20, 2009 in U.S. Appl. No. 11/487,327.

* cited by examiner

SIMILAR MUSIC SEARCH METHOD AND APPARATUS USING MUSIC CONTENT SUMMARY

CROSS-REFERENCE TO RELATED APPLICATION

This application claims priority from Korean Patent Application No. 10-2006-0008160, filed on Jan. 26, 2006, in the Korean Intellectual Property Office, the disclosure of which is incorporated herein by reference.

BACKGROUND OF THE INVENTION

1. Field of the Invention

The present invention relates to a method and apparatus for retrieving a similar music by using a music content summary, and more particularly, to a method and apparatus in which music content summaries are generated from music files and a similar music is retrieved from music content summaries whose mood and genre are identical with query music requested by a user by using the generated music content summaries.

2. Description of Related Art

Generally, to search for music similar to a music file selected from a music data with large capacity by a user, a function of summarizing music contents is essential.

However, in a conventional similar music search method, since a music content summary is not used and the entire music is used in mood classification and similar music search, a search speed is low and errors with respect to search performance occur.

In the conventional similar music search method, when extracting a music summary, a music signal is divided into short segments and well-known audio features such as Mel-Frequency Cepstral Coefficients (MFCC), Linear Productive Coding (LPC), and a Zero Crossing Rate (ZCR) of a non-compression zone are extracted from each of the segments to be used, a processing speed is low.

Also, in the conventional similar music search method, when extracting a music summary, since a segment clustering is performed by using a short distance between segments or clustering of segments is performed by using a Hidden Markov Model (HMM) to measure similarity, a classification error occurs due to a complicated configuration of the clustering, a great amount of computation required in forming the model, as well as a long processing time required.

Further, in the conventional similar music search method, when extracting a music feature value for a music mood classification and a music search, since a method of extracting a timbre, a tempo, and an intensity, which are well-known, from the non-compression zone is used, a decoding process of converting a general music file, for example, an MP3 file, into Pulse Code Modulation (PCM) data is required, thereby decreasing a processing speed.

Still further, in the conventional similar music search method, a mood class defined regardless of genre is used, thereby generating a classification error. Specifically, since, in the conventional similar music search method, the similar music is searched by measuring a similarity, regardless of a mood and a genre of music, thereby frequently generating an error of providing music different from that which is expected.

Lastly, in the conventional similar music search method, since pieces of music requested as a result of retrieving are checked by listening to a large part of the music, a long time is required until results are provided.

Accordingly, a method providing improved processing speed for retrieving music similar to the music file and which prevents an error in retrieving the similar music by retrieving the similar music from pieces of music whose mood and genre are identical to music to be searched.

BRIEF SUMMARY

An aspect of the present invention provides a method and apparatus, in which a music content summary is automatically extracted from a music file and a music mood and genre is classified using the extracted music summary for a similar music search.

An aspect of the present invention also provides a method and apparatus, in which a music summary is generated at high speed by extracting audio features from a compression zone of a music file, thereby improving a processing speed of classifying a mood and a genre and retrieving a similar music.

An aspect of the present invention also provides a method and apparatus, in which a music similar to a requested query music is searched by considering a result of classifying a mood and a genre of a music file.

An aspect of the present invention also provides a method and apparatus, in which a music summary of a music file recommended as a similar music is provided such that a desired music may be more quickly retrieved.

According to an aspect of the present invention, there is provided a similar music search method, including: extracting an audio feature value from a compression zone of a music file and generating a music content summary using the extracted audio feature; classifying a mood and a genre of the music file using the generated music content summary; extracting a similarity feature for a similarity retrieval from the music content summary; storing information on the classified mood and genre and the extracted similarity feature information in a database; receiving a query music; detecting a mood and a genre of the query music; measuring a similarity between the query music and music files that are identical in the mood and the genre to the query music by referring to the database; and retrieving the similar music with respect to the query music based on the measured similarity.

According to another aspect of the present invention, there is provided an apparatus for retrieving a similar music by using a music content summary, including: a music content summary generation unit extracting an audio feature value from a compression zone of a music file and generating the music content summary using the extracted audio feature value; a first feature extraction unit extracting an MDCT-based timbre feature and an MDCT-based tempo feature from the generated music content summary; a mood/genre classification unit classifying a mood and a genre of the music file according to the feature extracted by the first feature extraction unit; a second feature extraction unit extracting a similarity feature for a similarity retrieval from the music content summary; a database storing information on the classified mood and genre and the extracted similarity feature information; a music input unit receiving a query music; query music detection unit detecting a mood and a genre of the query music; and a retrieval unit measuring a similarity between the query music and music files that are identical in the mood and the genre to the query music and retrieving the similar music with respect to the query music according to the measured similarity.

According to another aspect of the present invention, there is provided a similar music search method, including: classifying a mood and a genre of a music file using a music content summary generated based on an extracted audio feature value from a compression zone of the music file; extracting a similarity feature for a similarity retrieval from the music content summary; storing information on the classified mood and genre and an extracted similarity feature from the music content summary; detecting a mood and a genre of an input query music; measuring a similarity between the query music and music files that are identical in mood and genre to the query music by referring to the database; and retrieving the similar music with respect to the query music based on the measured similarity.

According to another aspect of the present invention, there is provided a music contents summary generation method, including: extracting an audio feature value from a compression zone of the music file; reconfiguring segments of the music file by tracking a music content change point using the extracted feature values; first clustering the reconfigured segments using a Bayesian Information Criterion (BIC) method, and measuring a similarity and a repeatability between the reconfigured segments; extracting an MDCT-based timbre feature and an MDCT-MS-based tempo feature from each of the reconfigured segments; second clustering the reconfigured segments by calculating a Euclidean distance for the extracted timbre and tempo features and measuring the similarity and the repeatability between the reconfigured segments, the reconfigured segments being second clustered according to the similarity values based on the Euclidean distances; and determining the similarity and the repeatability between the segments based on a result of a comparison between the first clustering a the second clustering.

According to other aspects of the present invention, there are provided computer-readable recording media in which programs for executing the aforementioned methods are recorded.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
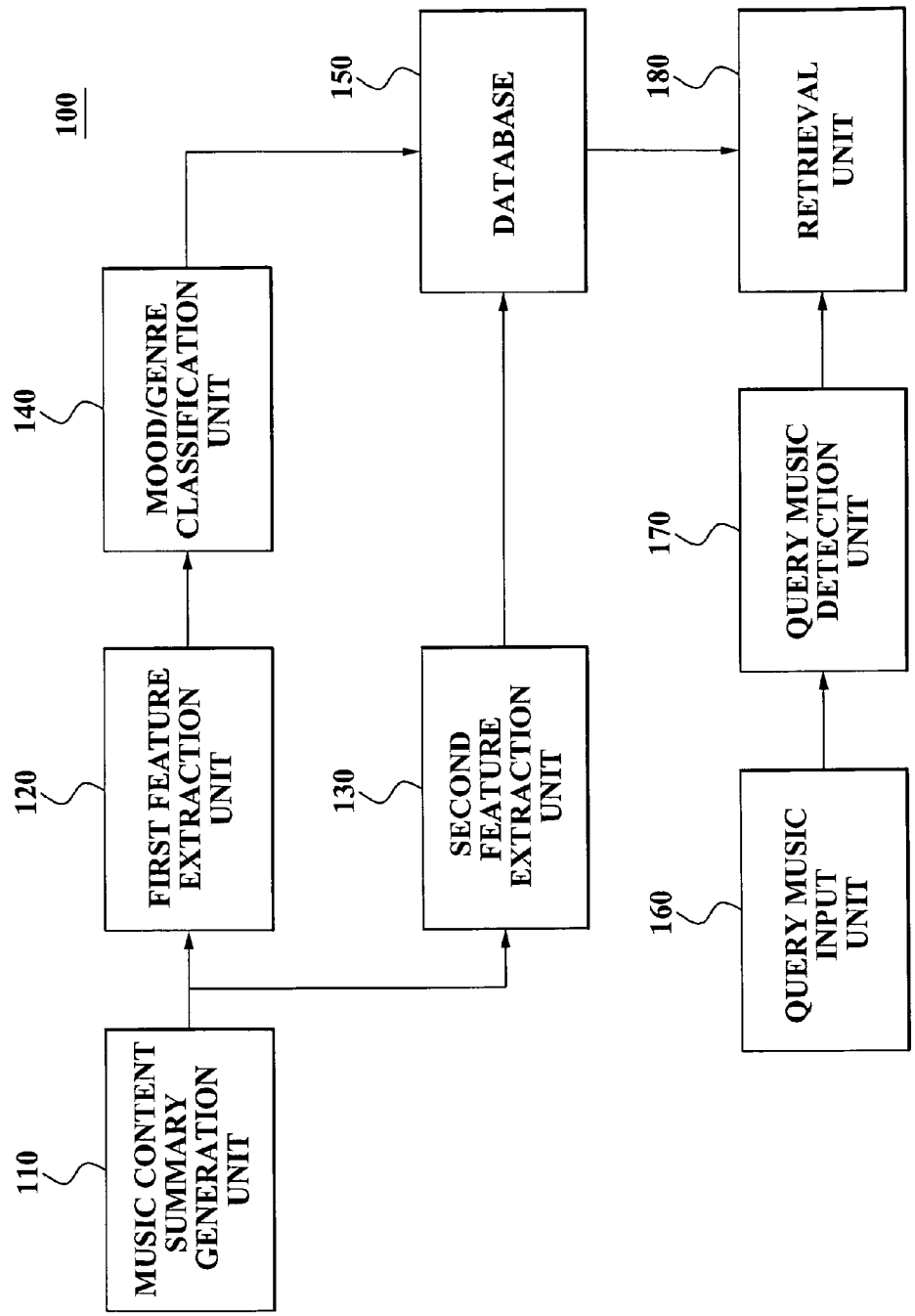
FIG. 1 is a diagram illustrating a configuration of a similar music search apparatus using a music content summary, according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
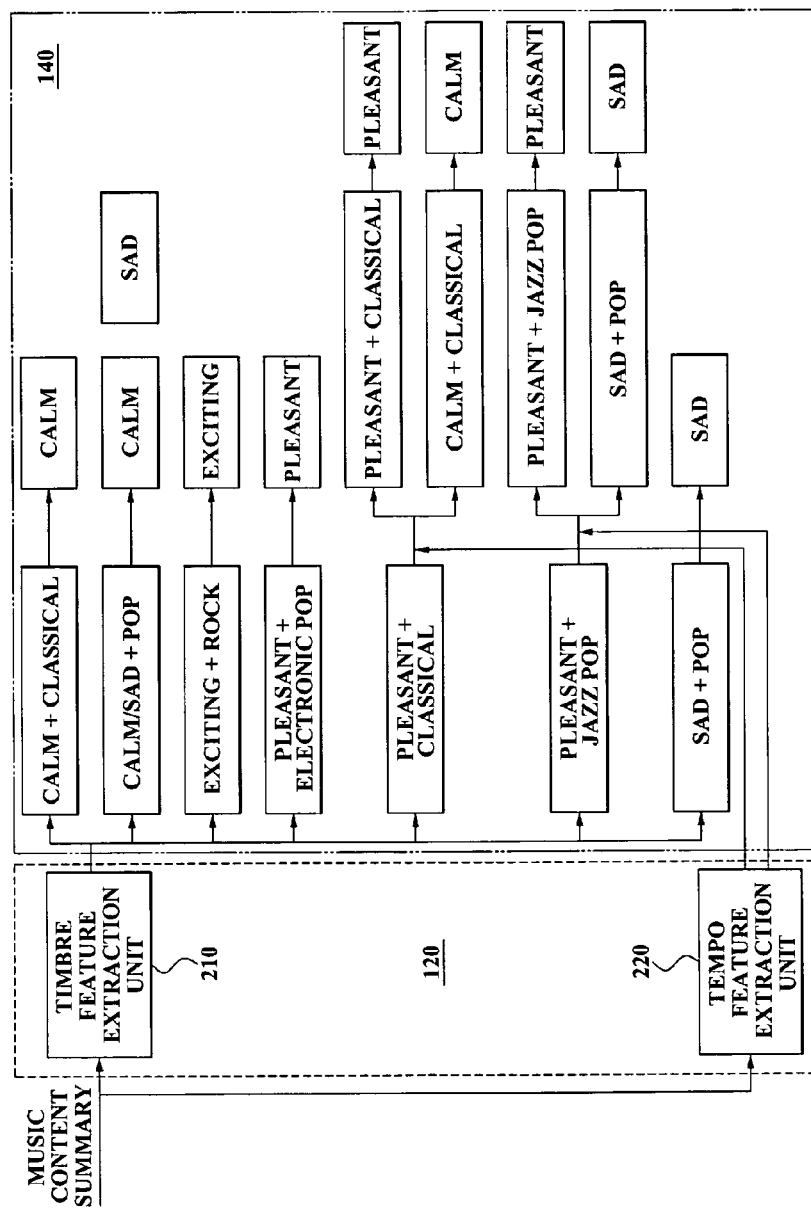
FIG. 2 is a diagram illustrating an example of classifying a mood and a genre with respect to a music content summary in the similar music search apparatus according to an embodiment.

FIG. 1 is a diagram illustrating a configuration of similar music search apparatus 100 using a music content summary, according to an embodiment of the present invention, and FIG. 2 is a diagram illustrating an example of classifying mood/genre with respect to the music content summary in the similar music search apparatus according to the present embodiment.

Referring to FIG. 1, the similar music search apparatus 100 includes a music content summary generation unit 110, a first feature extraction unit 120, a second feature extraction unit 130, a mood/genre classification unit 140, a database 150, a query music input unit 160, a query music detection unit 170, and a retrieval unit 180.

The music content summary generation unit 110 extracts an audio feature value from a compression zone of a music file and generates a music content summary by using the extracted audio feature value.

The first feature extraction unit 120 extracts a first feature for classifying a mood and a genre of a music, from the music file. The first feature extraction unit 120 includes a timbre feature extraction unit 210 and a tempo feature extraction unit 220 as shown in FIG. 2.

Referring to FIG. 2, the timbre feature extraction unit 210 extracts a Modified Discrete Cosine Transformation (MDCT)-based timbre feature from the compression zone of the music file. Specifically, the timbre feature extraction unit 210 extracts MDCT coefficients by decoding a part of the music file compressed by, for example, a Moving Picture Experts Group Audio Layer-3 (MP3) technique, selects a predetermined number of MDCT coefficients from the extracted MDCT coefficients, and may extract a timbre feature from the selected MDCT coefficients. Also, the timbre feature extraction unit 210 may extract the MDCT coefficients from music files of various music file formats such as an AAC (Advanced Audio Coding) format as well as an MP3 format.

The tempo extraction unit 220 obtains MDCT-based tempo features from the compression region of the music files. Specifically, the tempo extraction unit 220 extracts MDCT coefficients by decoding a part of a music file compressed in the MP3 format or the ACC format. Then the tempo extraction unit 220 selects proper MDCT coefficients among the extracted MDCT coefficients and extracts an MDCT-MS (MDCT Modulation Spectrum) from the selected MDCT coefficients by performing a DFT (Discrete Fourier Transformation). Also the tempo extraction unit 220 divides the extracted MDCT-MS into sub-bands and extracts an energy from the sub-bands in order to use the energy as tempo features of the music files.

As described above, since the timbre feature and the tempo feature are extracted from the compression zone of the music file, the similar music search apparatus 100 may improve a processing speed in comparison with a conventional extraction in the decompression zone.

Referring to FIG. 1, the second feature extraction unit 130 obtains second features from the music files to retrieve the similarity. Specifically, the second extraction unit 130 extracts a MDCT-based timbre feature and a MDCT-based tempo feature from the music file, calculates a maximum, an average, and a standard deviation value with respect to each of the extracted features, and stores the maximum, the average, and the standard deviation value in the database 150.

The mood/genre classification unit 140 classifies the music file by the mood and the genre of the music file by using the generated music content summary. The mood/genre classification unit 140 may classify the music file based on the extracted timbre feature and tempo feature.

As shown in FIG. 2, the mood/genre classification unit 140 may firstly sort the music files according to seven classes with four types of moods, e.g. a calm in classical, a calm/sad in pop, an exciting in rock, a pleasant in electronic pop, a pleasant in classical, a pleasant in jazz pop, and a sad in pop, depending on the timbre features extracted by the timbre extraction unit 210.

As shown in FIG. 2, when a result of first classifying the mood is, for example, 'pleasant+classical', the mood/genre classification unit 140 may secondly reclassify the mood classification result into 'calm+classical' or 'pleasant+classical' with reference to the extracted tempo feature.

When the result of first classifying the mood is, for example, 'pleasant+jazz pop', the mood/genre classification unit 140 may secondly, reclassify the mood classification result into 'sad+pop' or 'pleasant+jazz pop' with reference to the extracted tempo feature.

When the music file includes tag information having genre information, the mood/genre classification unit 140 may extract the tag information from the music file and may classify the genre with respect to the music file by using the genre information of the extracted tag information.

The mood/genre classification unit 140 stores the mood information and the genre information of the classified music file in the database 150.

The database 150 collects, as a metadata, the mood information and the genre information of the classified music files and the extracted second feature information for a similarity retrieval. The second feature information includes the maximum, the average, and the standard deviation of features extracted as the MDCT-based timbre features and the MDCT-MS-based tempo features from the music files.

The query music input unit 160 receives an input of query music information.

The query music detection unit 170 detects the mood and the genre of the query music by using the received query music information and detects features for the similarity retrieval, from the query music.

When a music file corresponding to the received query music information is stored in the database 150, the query music detection unit 170 detects the mood and the genre of the music file from the database 150 and may detect the features for the similarity retrieval from the query music.

The retrieval unit 180 retrieves similar music from music files whose mood and genre are identical to the query music by referring to the database 150.

The retrieval unit 180 may retrieve similar music with respect to the query music by using the maximum, the average, and the standard deviation from the music files whose mood and genre are identical with the query music.

The retrieval unit 180 may calculate a Euclidean distance of the features of the music files whose mood and genre are identical to the query music and may detect N pieces of candidate music whose calculated distance is less than a predetermined value, as similar music.

Figure 3:
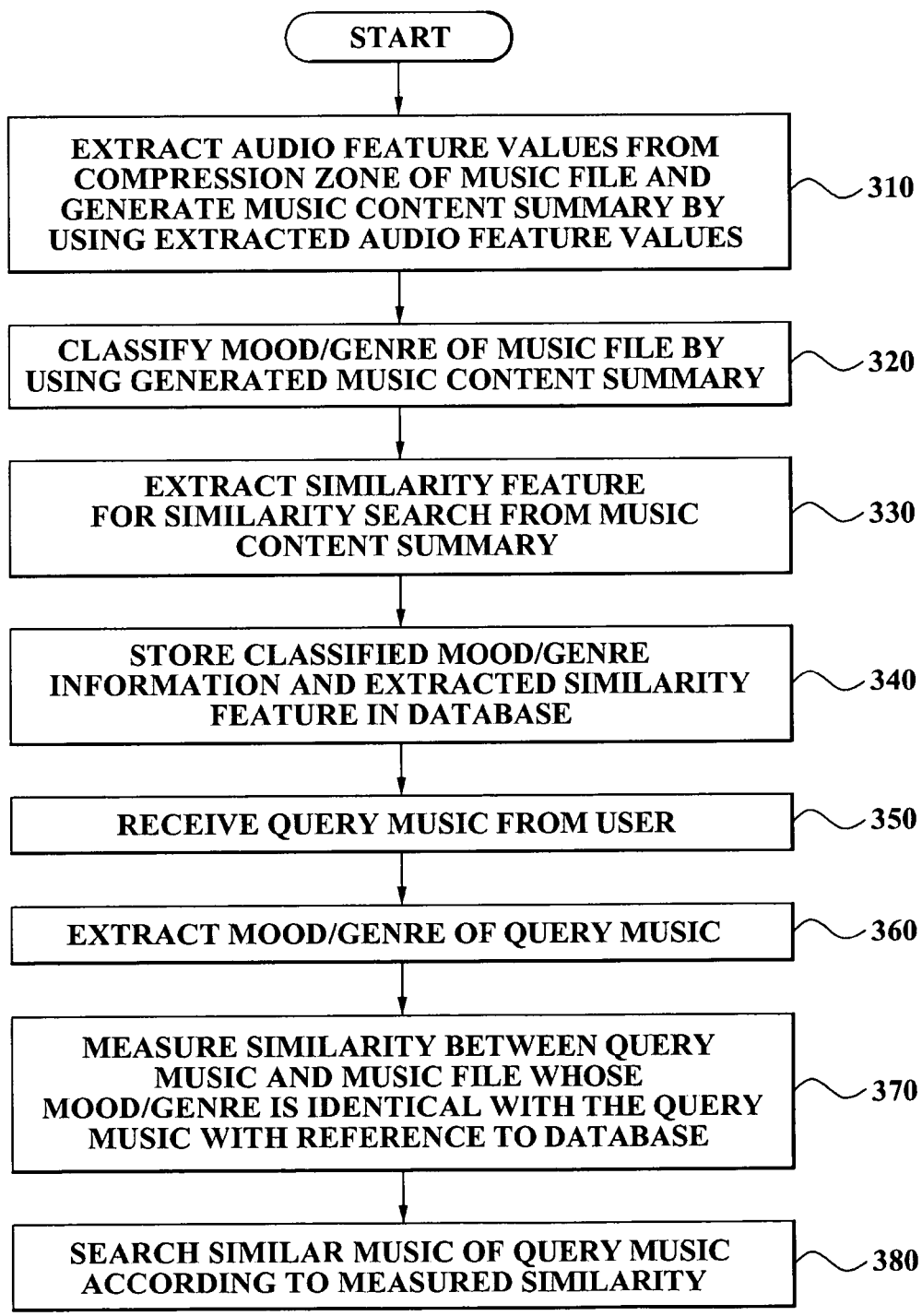
FIG. 3 is a flowchart illustrating a similar music search method using a music content summary, according to an embodiment of the present invention.

FIG. 3 is a flowchart illustrating a similar music search method using the music content summary, according to an embodiment of the present invention.

Referring to FIG. 3, in operation 310, a similar music search apparatus extracts audio feature values from a compression zone of a music file and generates a music content summary by using the extracted audio feature values. The process of generating the music content summary in operation 310 will be described in detail with reference to FIG. 4.

Figure 4:
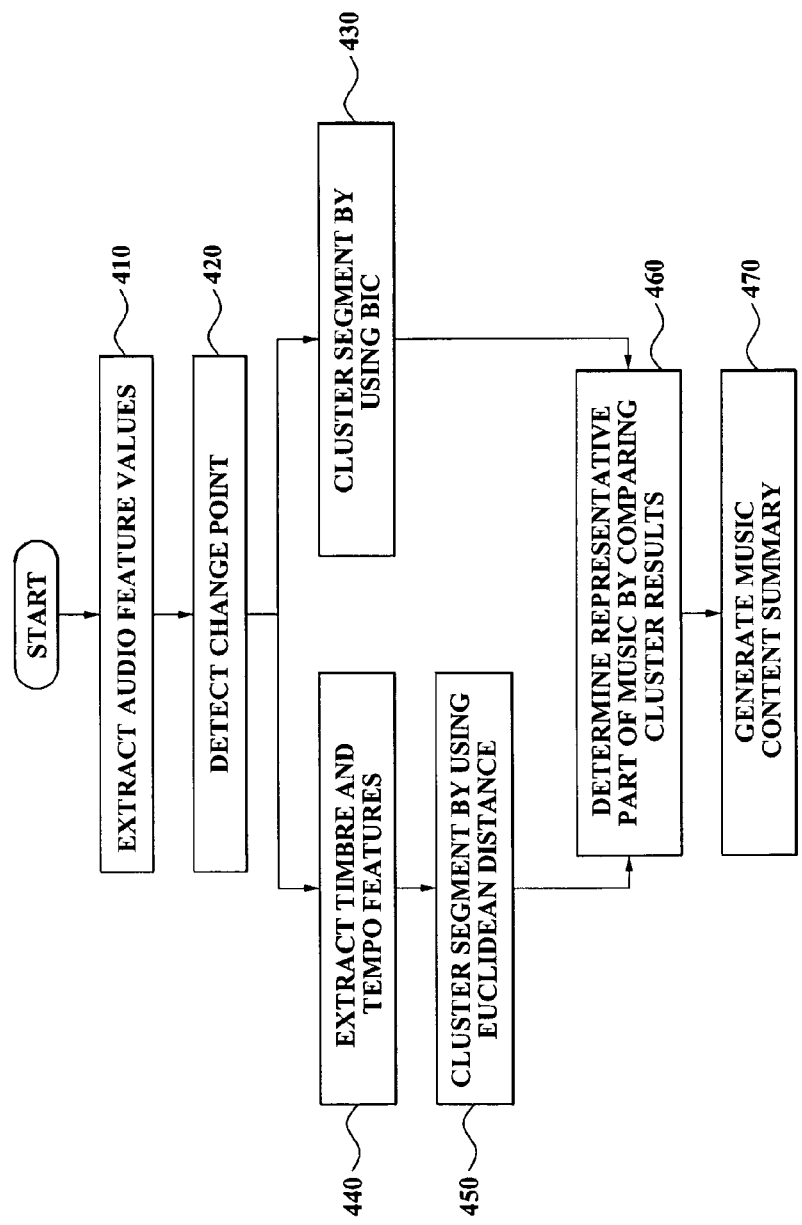
FIG. 4 is a flowchart illustrating a process of generating a music content summary in the similar music search method, according to an embodiment.

FIG. 4 is a flowchart illustrating a process of generating the music content summary in the similar music search method, according to the present embodiment. This method is, for ease of explanation only, described as being performed by a music search apparatus.

Referring to FIG. 4, in operation 410, the similar music search apparatus extracts the audio feature value from the compression zone of the music file.

In operation 410, the similar music search apparatus may extract MDCT feature values by decoding a part of the compression zone of the music file. The operation of extracting the MDCT feature values will be described in detail in a process of extracting a timbre feature below.

As described above, in the similar music search method according to the present embodiment, the audio feature values are extracted from the compression zone of music data, thereby improving a processing speed in comparison with a conventional method of extracting the audio feature values in a decompression from a non-compression zone.

In operation 420, the similar music search apparatus reconfigures segments by tracking a music content change point by using the extracted feature values. Specifically, in operation 420, the similar music search apparatus establishes two segments window 1 and window 2 having a fixed length, based on the extracted MDCT feature values.

Figure 5:
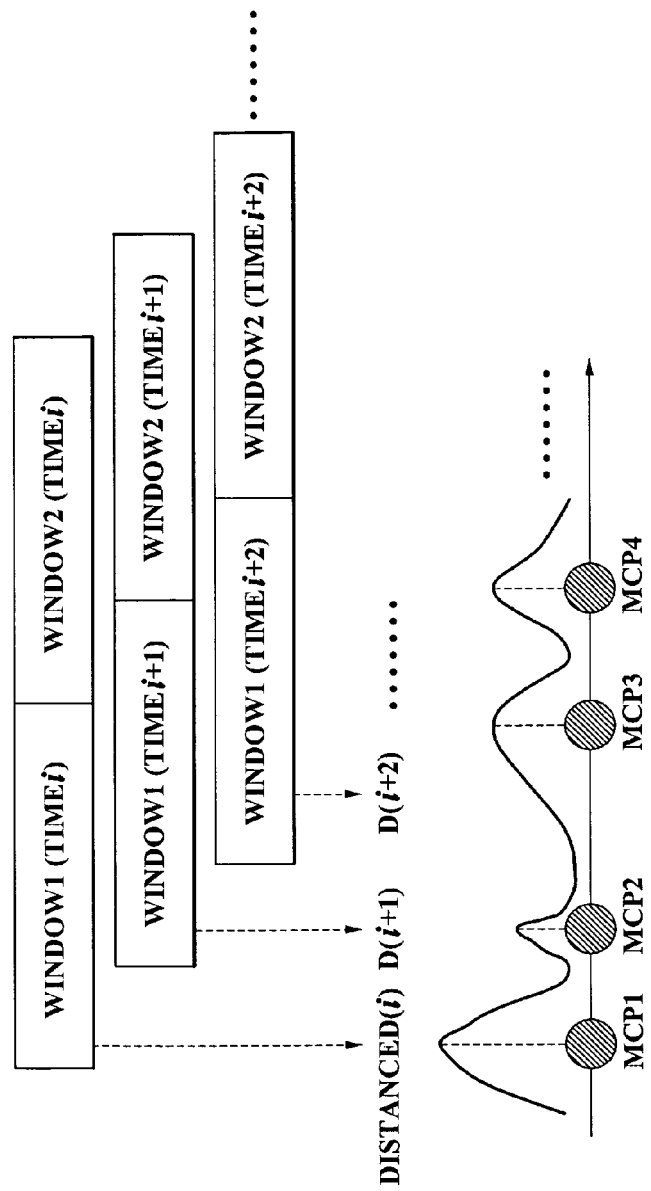
FIG. 5 is a diagram illustrating an example of tracking a music content change point, in the similar music search method, according to an embodiment.

In operation 420, as shown in FIG. 5, the similar music search apparatus shifts the two segments window 1 and window 2 at a certain time interval according to the music data, determines similarity between the two segments window 1 and window 2, and tracks the music content change points MCP1, MCP2, MCP3, and MCP4.

In operation 420, the similar music search apparatus establishes two segments having a fixed length, for example, more than three seconds, and shifts the two segments at a fixed interval of less than 1.5 seconds according to an entire music signal, thereby determining similarity between the two segments.

In operation 420, the similar music search apparatus may track the music content change points by using a Modified Kullback-Leibler Distance (MKL) method to determine whether the similarity exists.

In operation 420, the similar music search apparatus calculates a plurality of peaks by using the MKL method defined as follows $$d_{MKL} = \frac{1}{2} tr\left[\left(\sum_l - \sum_r\right)\left(\sum_l^{-1} - \sum_r^{-1}\right)\right]$$ [Equation 1]

where Σ is covariance, l is a left segment of two segments, and r is a right segment of the two segments.

In the similar music search method according to the present embodiment, since peaks of various intervals and heights appear when the MLK method is used, which peak is determining the music content change point is difficult to be distinguished. Therefore, operations as below are further performed.

In operation 420, the similar music search apparatus compares N number of peaks from the calculated peaks and distinguishes the N number of peaks into any one of a high peak, a low peak, and an interval peak.

In operation 420, the similar music search apparatus may compare, for example, more than five peaks calculated by the MLK method and may distinguish the five peaks into any one of the high peak, the low peak, and the interval peak.

Figure 6:
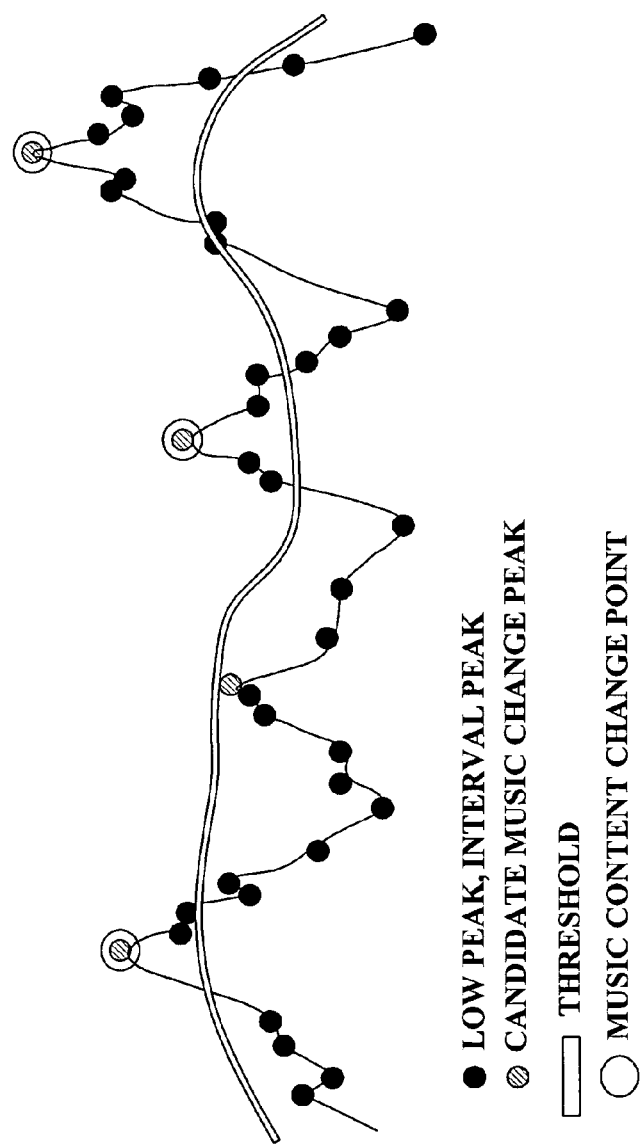
FIG. 6 is a diagram illustrating an example of detecting a music content change point from candidate music change peaks, in the similar music search method, according to an embodiment.

In operation 420, as shown in FIG. 6, the similar music search apparatus determines the high peaks satisfying a defined slope section to be candidate music change peaks. In the defined slope section, the high peak is higher than a previous peak and next five peaks.

In operation 420, as shown in FIG. 6, the similar music search apparatus determines the candidate music change peaks more than a threshold from the plurality of candidate music change peaks to be the music content change points. The threshold is automatically generated by using an average value with respect to more than S number of peaks, calculated by the MKL method.

As described above, in the similar music search method according to the present embodiment, the music content change points may be more clearly tracked by using a strong peak search algorithm.

In operation 430, the similar music search apparatus takes a part of adjacent length from each of the reconfigured segments, clusters the segments using a Bayesian Information Criterion (BIC) method, and measures a similarity and a repeatability between the segments.

As described above, in the similar music search method according to the present embodiment, since the segments according to the music content change points are used in clustering, complexity of the clustering may be reduced.

Also, in the similar music search method according to the present embodiment, the segment separated from the segment formed according to the music content change point at a certain interval is selected to be clustered, thereby increasing precision of the clustering.

In operation 430, the similar music search apparatus selects a section of a certain distance from each of the segments obtained by the tracked music content change points and may measure the similarity and the repeatability between the segments by the BIC method defined as follows $$R_{BIC}(i) = \frac{N_{Total}}{2}\log|\sum_{Total}| - \frac{N_l}{2}\log|\sum_l| - \frac{N_r}{2}\log|\sum_r|$$ [Equation 2]

where N is a length of a segment.

The similar music search apparatus may determine the segment to be similar when $R_{BIC}(i)$ calculated by equation 2 is greater than '0' and may determine the segment to be not similar when $R_{BIC}(i)$ is not greater than '0'.

As described above, in the similar music search method according to the present embodiment, since an error occurs when comparing the similarity by taking a covariance matrix of a different distribution from segments of various lengths, the similarity and the repeatability between the segments may be determined by the BIC method by selecting a section of more than a certain length, for example, three seconds from the segments of various lengths obtained by the detected music content change point to the error.

In operation 440, the similar music search apparatus extracts an MDCT-based timbre feature and an MDCT-MS-based tempo feature from each of the segments formed from the detected music content change point to analyze music contents.

In operation 450, to combine two types of the extracted features, the similar music search apparatus may calculate a centroid, a bandwidth, a flux, and a flatness from two types of features.

In operation 450, the similar music search apparatus calculates a Euclidean distance with respect to the extracted timbre and tempo features and measures the similarity and the repeatability between the segments by clustering according to a value of the similarity, obtained by the calculation of the Euclidean distance.

In operation 450, the similar music search apparatus may determine a largest cluster acquired by clustering the segments using the Euclidean distance to be a representative candidate of a part of the music data.

In operation 460, the similar music search apparatus determines the similarity and the repeatability between the segments according to a result of comparing a first clustering result using the BIC method with a second clustering result using the Euclidean distance method.

In operation 460, the similar music search apparatus may determine the similarity and the repeatability between the segments which are representative parts of the music data by using a consistent part acquired by comparing the first clustering result with the second clustering result.

In operation 460, when there is no consistent part acquired by comparing the first clustering result with the second clustering result, the similar music search apparatus may determine the similarity and the repeatability between the segments which are the representative parts of the music data, according to the second clustering result.

As described above, in the similar music search method according to the present embodiment, a music content summary may be formed at a high speed by combining the BIC method in which a segment, separated from a segment formed according to a music content change point at a certain interval, is selected, and the Euclidean distance method using the timbre and tempo features extracted from the compression zone.

In operation 470, the similar music search apparatus generates the music content summary by using the segment selected by the measured similarity and repeatability between the segments.

In operation 470, the similar music search apparatus determines pairs of the segments according to the measured similarity, selects a first segment of the determined pairs as an object of summarization, and may generate a music content summary of a certain time by considering a rate of each of the selected segments.

Figure 7:
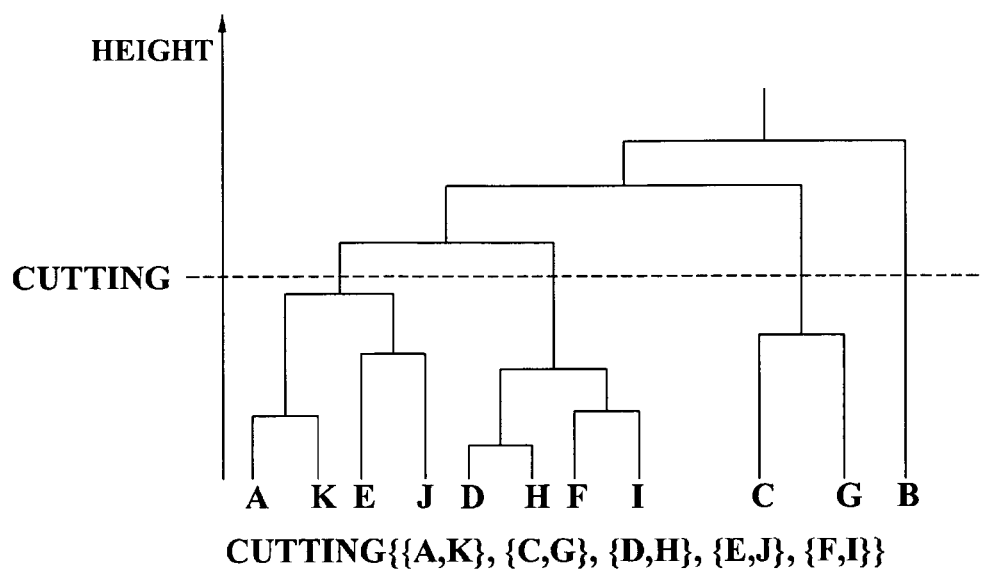
FIG. 7 is a diagram illustrating an example of clustering a segment in the similar music search method according to an embodiment.

In operation 470, as shown in FIG. 7, the similar music search apparatus determines the pairs of the segments {A, K}, {C, G}, {D, H}, {E, J}, and {F, I} according to the measured similarity.

In operation 470, the similar music search apparatus excludes a segment B that has no similarity according to an arrangement order of the segments according to the similarity of each of the segments and selects the first segments A, C, D, E, and F of the determined pairs of the segments {A, K}, {C, G}, {D, H}, {E, J}, and {F, I} to be the object of summarization. The similar music search apparatus may generate the music content summary of the certain time by considering a rate of each of the selected segments A, C, D, E, and F.

Figure 8:
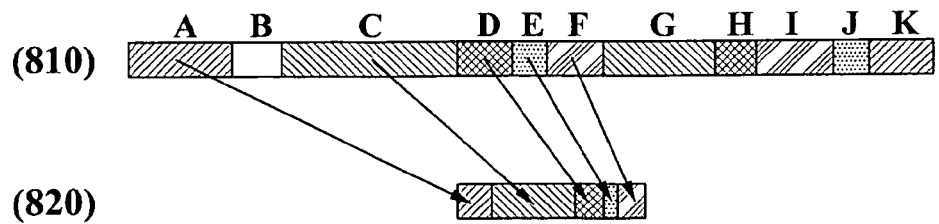
FIG. 8 is a diagram illustrating an example of generating a music content summary in the similar music search method.

In operation 470, as shown in FIG. 8, the similar music search apparatus may generate a music content summary 820 of, for example, 50 seconds by considering the rate of the selected segments based on C that is a longest segment from the selected A, C, D, E, and F of a music data 810.

Also, the similar music search apparatus may replay the longest segment C as a highlight of the music data via the generated music content summary 820. For example, in the case of a previously played music, a longest segment may be replayed as a highlight.

Also, since music data of 3 to 4 minutes is provided, for example, as a music content summary of approximately 50 seconds, the similar music search method according to the present embodiment may be effectively applied to a music recommendation apparatus in which a search for a music or a feedback is required.

In operation 320, the similar music search apparatus classifies a mood and a genre of the music file by using the generated music content summary.

In operation 320, the similar music search apparatus may extract the MDCT-based timbre feature from the compression zone of the music content summary.

A process of extracting the MDCT-based timbre feature in operation 320 will be described below in detail with reference to FIG. 9.

Figure 9:
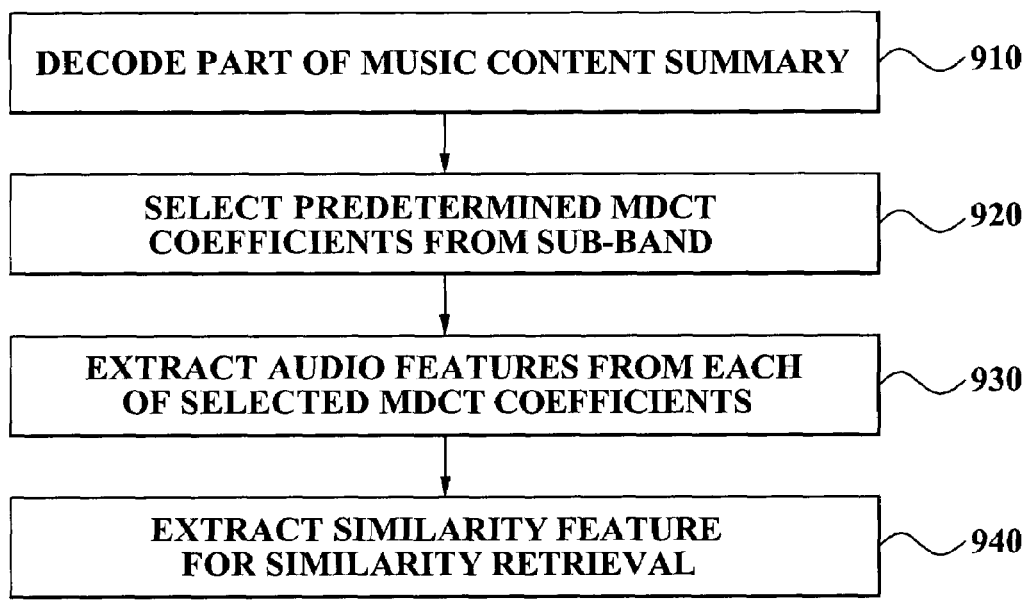
FIG. 9 is a diagram illustrating an example of a process of extracting a timbre feature, in the similar music search method according to an embodiment.

FIG. 9 is a diagram illustrating an example of the process of extracting a timbre feature, in the similar music search method according to the present embodiment.

Referring to FIG. 9, in operation 910, the similar music search apparatus extracts, as an example, 576 MDCT coefficients $S_i(n)$ by decoding a part of a music content summary of a music file, compressed by a predetermined compression method. In this case, n indicates a frame index of MDCT, and i (0 to 575) indicates a sub-band index of the MDCT.

In operation 920, the similar music search apparatus selects predetermined MDCT coefficients $S_k(n)$ from the above example of 576 sub-bands. In this case, $S_k(n)$ represents the selected MDCT coefficients, and k (<i) represents the selected MDCT sub-band index.

In operation 930, the similar music search apparatus extracts 25 timbre features from each of the selected MDCT coefficients. The extracted timbre features may include a spectral centroid, a bandwidth, a rolloff, a flux, a spectral sub-band peak, a valley, and an average.

$$C(n) = \frac{\sum_{i=0}^{k-1}(k+1)s_i(n)}{\sum_{i=0}^{k-1}s_i(n)} \quad \text{[Equation 3]}$$

Equation 3 is related to a spectral centroid, which represents a highest beat rate.

$$B(n) = \sqrt{\frac{\sum_{i=0}^{k-1}[i+1-C(n)]^2 \times S_i(n)^2}{\sum_{i=0}^{K-1}S_i(n)^2}} \quad \text{[Equation 4]}$$

Equation 4 is related to a bandwidth, which represents a range of a beat rate.

$$\sum_{i=0}^{R(n)}s_i(n) = 0.95 \cdot \sum_{i=0}^{k-1}s_i(n) \quad \text{[Equation 5]}$$

Equation 5 is related to a rolloff.

$$F(n) = \sum_{i=0}^{k-1}(s_i(n) - s_i(n-1))^2 \quad \text{[Equation 6]}$$

Equation 6 is related to a flux, which represents a variation of the beat rate according to a time.

$$B_{peak}(n) = \max_{0 \le i \le l-1}[|s_i(n)|] \quad \text{[Equation 7]}$$

Equation 7 is related to a sub-band peak.

$$B_{valley}(n) = \min_{0 \le i \le l-1}[|s_i(n)|] \quad \text{[Equation 8]}$$

Equation 8 is related to a valley.

$$B_{average}(n) = \frac{1}{I} \cdot \sum_{i=0}^{l-1}|s_i(n)| \quad \text{[Equation 9]}$$

Equation 9 is related to an average.

In operation 930, the similar music search apparatus extracts a flatness feature from the selected MDCT coefficients.

$$Ft(n) = 20\log_{10}\left(\frac{\sum_{i=0}^{k-1}\log(s_i(n))}{\sum_{i=0}^{k-1}s_i(n)}\right) \quad \text{[Equation 10]}$$

Equation 10 is related to a flatness, which indicates what feature a clear and strong beat is.

In operation 940, the similar music search apparatus extracts a timbre feature for a similarity retrieval. Specifically, in operation 940, the similar music search apparatus may calculate a maximum, a mean, and a standard deviation with respect to the spectral centroid, the bandwidth, the flux, and the flatness to extract a similarity feature for the similarity retrieval.

Conversely, in operation 320, the similar music search apparatus may extract the MDCT-based tempo feature from the compression zone of the music content summary. A process of extracting the MDCT-based tempo feature in 320 will be described in detail below with reference to FIG. 10.

Figure 10:
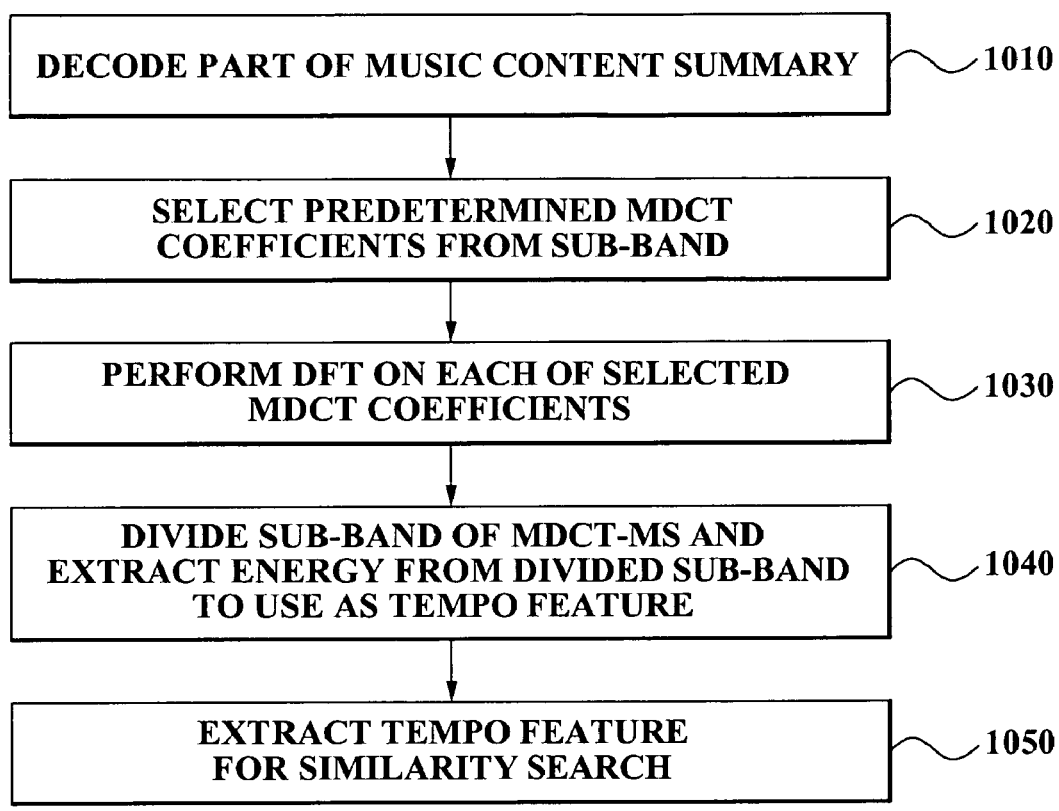
FIG. 10 is a diagram illustrating an example of extracting a tempo feature, in the similar music search method according to an embodiment.

FIG. 10 is a diagram illustrating an example of extracting the tempo feature, in the similar music search method according to the present embodiment.

Referring to FIG. 10, in operation 1010, the similar music search apparatus extracts, as an example 576 MDCT coefficients $S_i(n)$ by decoding a part of a music content summary of a music file, compressed by a predetermined compression technique. In this case, n indicates a frame index of MDCT, and i (0 to 575) indicates a sub-band index of the MDCT.

In operation 1020, the similar music search apparatus selects predetermined MDCT coefficients $S_k(n)$ from, for example 576 sub-bands. In this case, $S_k(n)$ indicates the selected MDCT coefficients, and k (<i) indicates the selected MDCT sub-band index.

In operation 1030, the similar music search apparatus extracts an MDCT-MS by performing a Discrete Fourier Transform (DFT) on the selected MDCT coefficients.

$$X_k(n) = s_k(n) \qquad \text{[Equation 11]}$$

$$Y_k(q) = \sum_{n=0}^{N-1} X_k(n) e^{-j\frac{2\pi}{N}nq} \qquad \text{[Equation 12]}$$

In this case, q is a modulation frequency, and a modulation resolution depends on N that is a DFT length.

The MDCT-MS on which the DFT is performed by using a time shift may be shown as a four-dimensional form having three variables as in equation 13.

$$Y_{t,k}(q) = \sum_{n=0}^{N-1} X_k(t+n) e^{-j\frac{2\pi}{N}nq} \qquad \text{[Equation 13]}$$

In this case, t indicates a time index, Specifically, a shift of the MDCT-MS in time.

In operation 1040, the similar music search apparatus divides the extracted MDCT modulation spectrum into N number of sub-bands and extracts energy from the sub-bands to use as the MDCT-MS-based tempo feature.

In operation 1050, the similar music search apparatus extracts a centroid, a bandwidth, a flux, and a flatness as the extracted MDCT-MS-based tempo feature so as to retrieve a similarity. Specifically, in operation 1050, the similar music search apparatus may extract the centroid, the bandwidth, the flux, and the flatness according to the MDCT-MS-based tempo feature, as the similarity feature.

As described above, the similar music search method extracts the audio features for the similar music retrieval from a compression zone, thereby reducing complexity required in feature extraction.

In operation 320, the similar music search apparatus classifies the mood and the genre of the music file based on the timbre feature and tempo feature extracted from the music content summary.

In operation 320, the similar music search apparatus classifies the genre of the music file based on the extracted timbre feature and may reclassify a category with respect to the music file of the genre when an ambiguity of a result of the genre classification is more than a predetermined value.

Specifically, in operation 320, when the ambiguity of the genre classification result is more than the predetermined value, the similar music search apparatus may reclassify the category with respect to the music file of the genre based on the extracted tempo feature.

In operation 320, the similar music search apparatus may classify the mood with respect to the music file into any one of seven classes with four types of moods based on the extracted timbre feature first. For example, there may be a calm in classical, a calm/sad in pop, an exciting in rock, a pleasant in electronic pop, a pleasant in classical, a pleasant in jazz pop, and a sad in pop in the seven classes.

In operation 320, the similar music search apparatus may reclassify classes whose first mood classification result is highly ambiguous, for example, pleasant+classical and pleasant+jazz pop, based on the extracted tempo feature second.

Specifically, in operation 320, for example, the similar music search apparatus may reclassify the category of a music file classified into the 'pleasant+classical' into the 'calm+classical' or the 'pleasant+classical' according to the extracted tempo feature and may reclassify the category with respect to a music file classified into the 'pleasant+jazz pop' into the 'sad+pop' or the 'pleasant+jazz pop' according to the extracted tempo feature.

Also, in operation 320, the similar music search apparatus merges the categories with respect to the reclassified music files into K number of moods.

Specifically, in operation 320, the similar music search apparatus may merge the mood classification result first classified according to the extracted timbre feature and the second classified mood classification result according to the extracted tempo feature to merge into four mood classes such as an exciting, a pleasant, a calm, and a sad.

Conversely, in operation 320, the similar music search apparatus may classify the music file into fractionalized categories by using a Gaussian Mixture Model (GMM).

Also, in operation 320, when the music file includes tag information including genre information, the similar music search apparatus extracts the tag information from the music file and may classify a genre of the music file by using the genre information.

In operation 330, the similar music search apparatus extracts a similarity feature from the music files to retrieve the similarity of music.

In operation 330, the similar music search apparatus may extract the similarity feature for music similarity retrieval by extracting the timbre feature and the tempo feature.

Specifically, in operation 330, the similar music search apparatus calculates a maximum, a mean, and a standard deviation with respect to the timbre and tempo features extracted from the compression zone of the music content summary and may extract the similarity feature by using the maximum, the mean, and the standard deviation.

As described above, the similar music search method according to the present embodiment extracts music features for a similar music search from the compression zone, thereby improving an entire processing speed for the similar music retrieval.

In operation 340, the similar music search apparatus stores a mood information and a genre information and an extracted similarity feature of the classified music file in a predetermined database, as metadata.

In operation 350, the similar music search apparatus receives information with respect to query music for retrieving similar music. When the query music is stored in the database, a title of the stored query music may be input as information with respect to the query music.

In operation 360, the similar music search apparatus detects a mood and a genre of the inputted query music. In operation 360, when the mood information and the genre information of the query music are stored in the database, the similar music search apparatus may extract the mood information and the genre information of the query music from the database.

In operation 370, the similar music search apparatus measures similarity between the query music and a music file whose mood and genre is identical with the query music with reference to the database. Specifically, in operation 370, the similar music search apparatus calculates a Euclidean distance of features of the music file whose mood and genre are identical with the query music with reference to the database.

In operation 380, the similar music search apparatus retrieves similar music of the query music according to the measured similarity. Specifically, in operation 380, the similar music search apparatus may search N number of music files whose calculated Euclidean distance is less than a predetermined value.

The similar music search method according to the above-described embodiments of the present invention searches the similar music from music files whose mood and genre are identical by using a music mood and genre auto classification result, thereby improving reliability with respect to a search result.

Also, since the similar music search method searches from music files whose mood and genre are identical with the query music given for the similar music search, it is not required to search an entire music, thereby reducing a search time.

Embodiments of the present invention include a computer readable medium including a program instruction for executing various operations realized by a computer. The computer readable medium may include a program instruction, a data file, and a data structure, separately or cooperatively. The program instructions and the media may be those specially designed and constructed for the purposes of the present invention, or they may be of the kind well known and available to those skilled in the art of computer software arts. Examples of the computer readable media include magnetic media (e.g., hard disks, floppy disks, and magnetic tapes), optical media (e.g., CD-ROMs or DVD), magneto-optical media (e.g., optical disks), and hardware devices (e.g., ROMs, RAMs, or flash memories, etc.) that are specially configured to store and perform program instructions. The media may also be transmission media such as optical or metallic lines, wave guides, etc. including a carrier wave transmitting signals specifying the program instructions, data structures, etc. Examples of the program instructions include both machine code, such as produced by a compiler, and files containing high-level languages codes that may be executed by the computer using an interpreter. The hardware elements above may be configured to act as one or more software modules for implementing the operations of this invention.

The above-described embodiments of the present invention provide a method and apparatus, in which similar music is searched from music files whose mood and genre are similar according to results of classifying mood and genre of music by using a music content summary, thereby improving reliability with respect to a search result.

The above-described embodiments of the present invention also provide a method and apparatus, in which a music content summary is generated by extracting music features from a compression zone and a music mood and genre may be classified by the generated music content summary at high speed.

The above-described embodiments of the present invention also provide a method and apparatus which may improve an entire processing speed for a similar music search by extracting music features for the similar music search from a compression zone.

The above-described embodiments of the present invention also provide a method and apparatus which may reduce complexity for feature extraction by extracting audio features for similar music search from a compression zone.

The above-described embodiments of the present invention also provide a method and apparatus, in which, since a search is performed with respect to music files whose mood and genre are identical with query music given for similar music search, it is not required to search with respect to all music, thereby reducing a search time.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A similar music search method, comprising:
    extracting an audio feature value from a music file by decoding only a select compressed portion of the music file of all compressed portions of the music file, wherein the select compressed portion includes the extracted audio feature value, extracting the audio feature from the decoded portion, and generating a music content summary using the extracted audio feature;
    classifying a mood and a genre of the music file using the generated music content summary;
    extracting a similarity feature for a similarity retrieval from the music content summary;
    storing information on the classified mood and genre and the extracted similarity feature information in a database;
    receiving a query music;
    detecting a mood and a genre of the query music;
    measuring a similarity between the query music and music files that are identical in the mood and the genre to the query music by referring to the database; and
    retrieving the similar music with respect to the query music based on the measured similarity.

2. The method of claim 1, wherein the extracting an audio feature value from the music file and generating a music content summary includes:
    reconfiguring a segment by tracking a point at which music contents change using the extracted feature value;
    measuring the similarity and a repeatability between each segment by clustering a fragment with a certain length acquired from each reconfigured segment; and
    generating the music content summary using the segment selected by the measured similarity and repeatability between each segment.

3. The method of claim 1, wherein the classifying a mood and a genre of the music file using the generated music content summary includes:
    extracting a modified discrete cosine transformation (MDCT)-based timbre feature from the music content summary;
    extracting an MDCT-based tempo feature from the music content summary; and
    classifying the mood and the genre of the music file based on the extracted timbre feature tempo feature.

4. The method of claim 3, wherein the extracting an MDCT-based timbre feature from the music content summary includes:
    extracting MDCT coefficients by decoding a part of the music content summary;
    selecting a predetermined number of MDCT coefficients of a sub-band from the extracted MDCT coefficients; and extracting a spectral centroid, a bandwidth, a rolloff, a flux, and a flatness from the selected MDCT coefficients.

5. The method of claim 4, wherein the extracting a similarity feature for similarity retrieval from the music content summary includes computing a maximum, a mean, and a standard deviation of the extracted timbre feature.

6. The method of claim 3, wherein the extracting a MDCT-based tempo feature from the music content summary includes:
extracting the MDCT coefficients by decoding a part of the music content summary;
selecting an MDCT coefficient of a predetermined sub-band from the MDCT coefficients;
extracting an MDCT modulation spectrum (MS) from the selected MDCT coefficient by performing a Discrete Fourier Transformation (DFT); and
dividing the extracted MDCT-MS into N sub-bands and extracting energy from the sub-bands usable as an MDCT-MS-based tempo feature.

7. The method of claim 6, wherein, in the extracting a similarity feature for a similarity retrieval from the music content summary, a centroid, a bandwidth, a flux, and a flatness according to the MDCT-MS-based tempo feature are extracted as the similarity features.

8. The method of claim 1, wherein, in the measuring a similarity between the query music and music files identical in the mood and the genre to the query music by referring to the database, the similarity is measured by computing a Euclidean distance of the features of the music file that are identical in the mood and the genre with the query music.

9. The method of claim 8, wherein, in the retrieving the similar music with respect to the query music based on the measured similarity, a number of the music files with a computed Euclidean distance is less than a predetermined value.

10. A computer-readable recording medium in which a program for executing a similar music search method is recorded, the method comprising:
extracting an audio feature value from a music file by decoding only a select compressed portion of the music file of all compressed portions of the music file, wherein the select compressed portion includes the extracted audio feature value, extracting the audio feature from the decoded portion, and generating a music content summary using the extracted audio feature;
classifying a mood and a genre of the music file using the generated music content summary;
extracting a similarity feature for a similarity retrieval from the music content summary;
storing information on the classified mood and genre and the extracted similarity feature information in a database;
receiving a query music from a user;
detecting a mood and a genre of the query music;
measuring a similarity between the query music and music files that are identical in the mood and the genre to the query music by referring to the database; and
retrieving the similar music with respect to the query music based on the measured similarity.

11. An apparatus for retrieving a similar music by using a music content summary, the apparatus comprising:
a music content summary generation unit extracting an audio feature value from a music file by decoding only a select compressed portion of the music file of all compressed portions of the music file, wherein the select compressed portion includes the extracted audio feature value, extracting the audio feature from the decoded portion, and generating the music content summary using the extracted audio feature value;
a first feature extraction unit extracting an MDCT-based timbre feature and an MDCT-based tempo feature from the generated music content summary;
a mood/genre classification unit classifying a mood and a genre of the music file according to the feature extracted by the first feature extraction unit;
a second feature extraction unit extracting a similarity feature for a similarity retrieval from the music content summary;
a database storing information on the classified mood and genre and the extracted similarity feature information;
a music input unit receiving a query music;
query music detection unit detecting a mood and a genre of the query music; and
a retrieval unit measuring a similarity between the query music and music files that are identical in the mood and the genre to the query music and retrieving the similar music with respect to the query music according to the measured similarity.

12. The apparatus of claim 11, wherein the mood/genre classification unit classifies the mood and the genre of the music file based on the extracted timbre feature and the tempo feature.

13. The apparatus of claim 11, wherein:
the music file includes tag information including genre information; and
the mood/genre classification unit classifies the genre of the music file using the genre information of the tag information extracted from the music file.

14. The apparatus of claim 11, wherein:
the second feature detection unit computes a maximum, a mean, and a standard deviation with respect to the extracted feature; and
the database stores the computed maximum, the computed mean, and the computed standard deviation as metadata.

15. The apparatus of claim 14, wherein the retrieval unit searches the similar music with respect to the query music by using the maximum, the mean, and the standard deviation, from the music files that are identical in the mood and the genre with the retrieved query music.

16. The apparatus of claim 15, wherein the retrieval unit computes a Euclidean distance with respect to the maximum, the mean, and the standard deviation and retrieves candidates with a computed distance less than a predetermined value as the similar music.

17. The apparatus of claim 11, wherein the music file includes any one of a moving picture experts group audio layer-3 (MP3) file and an advanced audio coding (ACC) file.

18. A similar music search method, comprising:
classifying a mood and a genre of a music file using a music content summary generated based on an audio feature value extracted from the music file by decoding only a select compressed portion of the music file of all compressed portions of the music file, wherein the select compressed portion includes the extracted audio feature value and the extracted audio feature value is a Modified Discrete Cosine Transformation-based feature;
extracting a similarity feature for a similarity retrieval from the music content summary;
storing information on the classified mood and genre and an extracted similarity feature from the music content summary;
detecting a mood and a genre of an input query music;

measuring a similarity between the query music and music files that are identical in mood and genre to the query music by referring to the database; and retrieving the similar music with respect to the query music based on the measured similarity.

19. A computer-readable storage medium in which a program for executing the similar music search method of claim 18 is recorded.

20. A music contents summary generation method, the method comprising:

extracting an audio feature value from a music file;

reconfiguring segments of the music file by tracking a music content change point using the extracted feature values;

first clustering the reconfigured segments using a Bayesian Information Criterion (BIC) method, and measuring a similarity and a repeatability between the reconfigured segments;

extracting an MDCT-based timbre feature and an MDCT-MS-based tempo feature from each of the reconfigured segments;

second clustering the reconfigured segments by calculating a Euclidean distance for the extracted timbre and tempo features and measuring the similarity and the repeatability between the reconfigured segments, the reconfigured segments being second clustered according to the similarity values based on the Euclidean distances; and determining the similarity and the repeatability between the segments based on a result of a comparison between the first clustering a the second clustering.

21. The method of claim 20, wherein the determining includes determining the similarity and the repeatability between the reconfigured segments using a consistent part of the segments, when there is a consistent part.

22. The method of claim 20, wherein the determining includes determining the similarity and the repeatability between the reconfigured segments according to the second clustering result, when there is no consistent part.

* * * * *

UNITED STATES PATENT AND TRADEMARK OFFICE
CERTIFICATE OF CORRECTION

PATENT NO. : 7,626,111 B2
APPLICATION NO. : 11/487399
DATED : December 1, 2009
INVENTOR(S) : Hyoung Gook Kim et al.

It is certified that error appears in the above-identified patent and that said Letters Patent is hereby corrected as shown below:

Column 18, Line 10, change "a the" to --and the--.

Signed and Sealed this

Twenty-third Day of February, 2010

David J. Kappos
*Director of the United States Patent and Trademark Office*